(12) United States Patent
Hess et al.

(10) Patent No.: US 7,454,674 B2
(45) Date of Patent: Nov. 18, 2008

(54) DIGITAL JITTER DETECTOR

(75) Inventors: Greg M. Hess, Mountain View, CA (US); Edgardo F. Klass, Palo Alto, CA (US); Andrew J. Demas, Los Altos, CA (US); Ashish R. Jain, Mountain View, CA (US)

(73) Assignee: P.A. Semi, Inc., Santa Clara, CA (US)

( * ) Notice: Subject to any disclaimer, the term of this patent is extended or adjusted under 35 U.S.C. 154(b) by 304 days.

(21) Appl. No.: 11/325,123

(22) Filed: Jan. 4, 2006

(65) Prior Publication Data

US 2007/0157057 A1 Jul. 5, 2007

(51) Int. Cl.
*G01R 31/28* (2006.01)
(52) U.S. Cl. .................. 714/724; 375/371; 375/354; 375/357; 375/355; 702/79; 702/69
(58) Field of Classification Search .................. None
See application file for complete search history.

(56) References Cited

U.S. PATENT DOCUMENTS

| | | | |
|---|---|---|---|
| 6,795,515 B1 * | 9/2004 | Riedle et al. ................. 375/355 |
| 6,911,854 B2 | 6/2005 | Klass | |
| 7,120,215 B2 * | 10/2006 | Li et al. ....................... 375/371 |
| 7,149,166 B2 * | 12/2006 | Ren et al. ................. 369/47.33 |
| 7,236,555 B2 * | 6/2007 | Brewer ....................... 375/357 |
| 2005/0278131 A1 * | 12/2005 | Rifani et al. .................. 702/79 |

OTHER PUBLICATIONS

Phillip J. Restle, et al., "Timing Uncertainty Measurements on the Power5 Microprocessor," IEEE International Solid-State Circuits Conference, 2004, 8 pages.

* cited by examiner

*Primary Examiner*—John P Trimmings
*Assistant Examiner*—Steven D Radosevich
(74) *Attorney, Agent, or Firm*—Lawrence J. Merkel; Meyertons, Hood, Kivlin, Kowert & Goetzel, P.C.

(57) ABSTRACT

In one embodiment, a jitter detector comprises a logic circuit coupled to receive a plurality of inputs indicative of states captured from a plurality of outputs of a delay chain responsive to a first clock input and a plurality of clocked storage devices coupled to the logic circuit. The logic circuit is configured to identify a first input of the plurality of inputs that is: (i) captured in error from a corresponding one of the plurality of outputs of the delay chain, and (ii) the corresponding one of the plurality of outputs of the delay chain is least delayed by the delay chain among the plurality of outputs that are captured in error. The plurality of clocked storage devices are configured to accumulate an indication of which of the plurality of outputs have been captured in error over a plurality of clock cycles of the first clock input.

18 Claims, 4 Drawing Sheets

DIGITAL JITTER DETECTOR

BACKGROUND

1. Field of the Invention

This invention is related to the field of integrated circuits and, more particularly, to detecting jitter in integrated circuits.

2. Description of the Related Art

Digital logic generally relies on a clock or clocks to launch inputs and sample outputs to be launched on a subsequent clock cycle. Ideally, each cycle of the clock signal is identical to the other cycles. Particularly, the rising and falling edges of the clock signal occur at the same point in time in each clock cycle in an ideal clock signal.

Unfortunately, real integrated circuits do not have ideal clock signals. Instead, there is a certain amount of variation in the clock signal from clock cycle to clock cycle (e.g. the rising and falling edges may occur at different times). The variation may have a number of sources, and is generally referred to as jitter. For example, the circuitry that generates the clock signal (e.g. a phase locked loop (PLL)) may be a source of jitter. Additionally, effects that occur during the clock distribution (such as variation in the power supply voltage, interference from nearby signals or background noise, etc.) may be a source of jitter.

Digital logic designers may design for a certain amount of jitter in a given integrated circuit design, based on analysis of the clock generation circuitry, characteristics of the semiconductor fabrication process that will be used to manufacture the integrated circuit, the clock distribution network, the size of the integrated circuit, etc. However, the actual jitter experienced in the integrated circuit is often unknown. The actual integrated circuit may be experiencing less jitter than expected (in which case a higher operating frequency may be possible for the integrated circuit) or more jitter than expected (and the additional jitter may be a source of problems being experienced with the integrated circuit).

SUMMARY

In one embodiment, a jitter detector comprises a logic circuit coupled to receive a plurality of inputs indicative of states captured from a plurality of outputs of a delay chain responsive to a first clock input and a plurality of clocked storage devices coupled to the logic circuit. The logic circuit is configured to identify a first input of the plurality of inputs that is: (i) captured in error from a corresponding one of the plurality of outputs of the delay chain, and (ii) the corresponding one of the plurality of outputs of the delay chain is least delayed by the delay chain among the plurality of outputs that are captured in error. The plurality of clocked storage devices are configured to accumulate an indication of which of the plurality of outputs have been captured in error over a plurality of clock cycles of the first clock input.

In another embodiment, a jitter detector comprises a delay chain, a first plurality of clocked storage devices, a logic circuit, and a second plurality of clocked storage devices. The delay chain is configured to receive an input and to generate a plurality of outputs responsive to the input. Each output is delayed from the input by a different delay time. Each of the first plurality of clocked storage devices is coupled to receive a respective output of the plurality of outputs as an input and is further coupled to receive a first clock input. Coupled to receive outputs of the first plurality of clocked storage devices, the logic circuit is configured to identify a first clocked storage device of the plurality of clocked storage devices that captures the respective output in error, wherein the first clocked storage device captures the least delayed output of the plurality of outputs that are captured in error. The second plurality of clocked storage devices are coupled to the logic circuit and to receive a second clock input, wherein each of the second plurality of clocked storage devices corresponds to a respective one of the first plurality of clocked storage devices. The second plurality of clock storage devices are configured to accumulate an indication of which of the first plurality of clocked storage devices has captured the respective output in error, wherein the indication is accumulated over a plurality of clock cycles of the first clock input and the second clock input.

A method is contemplated as well. Over a plurality of clock cycles of a first clock in an integrated circuit, each of one or more jitter detectors accumulates an indication of which of a plurality of outputs of a delay chain are captured in error responsive to the first clock. A given output of the plurality of outputs is identified in each of the plurality of clock cycles as being the least delayed output that is captured in error and the given output is accumulated in the indication. The indication is output from each of one or more jitter detectors subsequent to the plurality of clock cycles.

BRIEF DESCRIPTION OF THE DRAWINGS

The following detailed description makes reference to the accompanying drawings, which are now briefly described.

Figure 1:
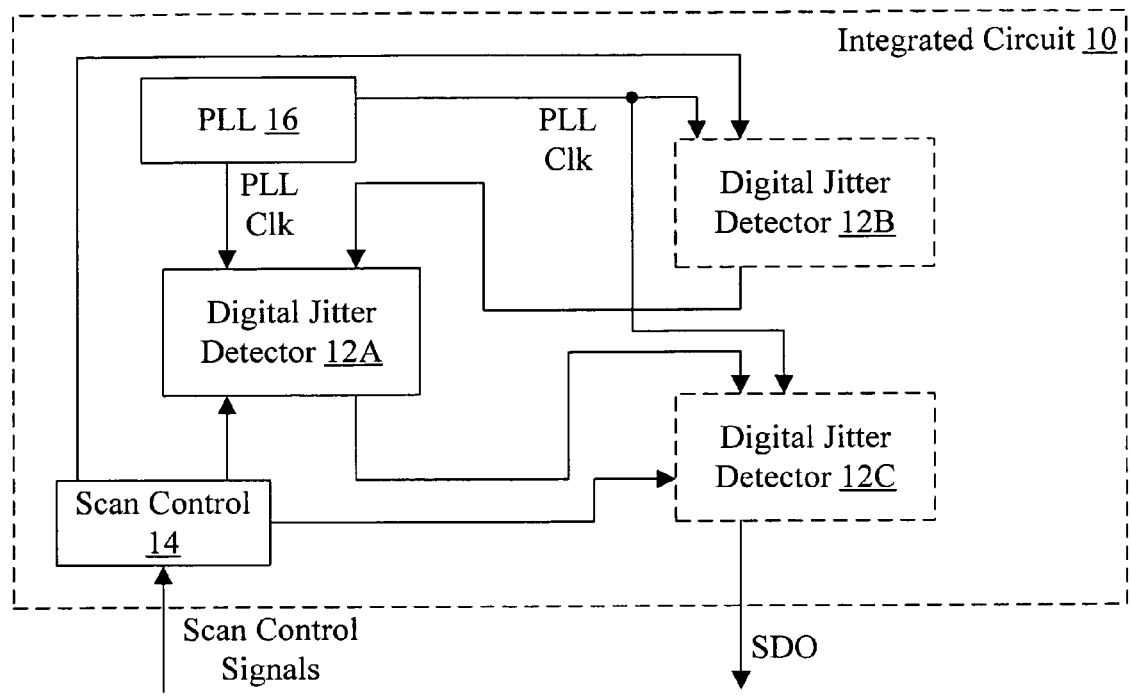
FIG. 1 is a block diagram on an integrated circuit including one or more digital jitter detectors.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of an integrated circuit 10 is shown. In the illustrated embodiment, the integrated circuit 10 includes at least one digital jitter detector 12A, and may include a plurality of digital jitter detectors (e.g. 12A-12C in FIG. 1). Any number of one or more digital jitter detectors may be used in various embodiments. The integrated circuit 10 also includes a scan control unit 14 and a PLL 16. The scan control unit 14 is coupled to receive various scan control signals from a source external to the integrated circuit (e.g. another component of the system that includes the integrated circuit 10 or external test circuitry, not shown in FIG. 1). Additionally, the scan control unit 14 is coupled to the digital jitter detectors 12A-12C. The digital jitter detectors 12A-12C may be coupled into a scan chain (e.g. from digital jitter detector 12B to digital jitter detector 12A to digital jitter detector 12C to the scan data out (SDO) output of the integrated circuit 10, in the illustrated embodiment) to permit jitter measurement results to be scanned out of the digital jitter detectors 12A-12C for observation external to the integrated circuit 10. Alternatively, one or more of the digital jitter detectors 12A-12C may be included in separate scan chains (e.g. with core logic circuitry, not shown in FIG. 1). There may also be a scan data input at the head of the scan chain, which may not be used by the digital jitter detectors 12A-12C (the scan in data may be a don't care), but could be used by core circuitry included in the scan chain. The PLL 16 is coupled to provide a clock signal (PLL Clk) to the digital jitter detectors 12A-12C (and also to core logic circuitry, not shown). While two PLL Clks are shown in FIG. 1 for convenience in the drawing, one PLL Clk signal may be routed to all digital jitter detectors 12A-12C. Alternatively, two or more physical clock signals (which are logically the same) may be routed. In yet other embodiments, multiple clock signals that are not logically the same may be routed.

In one embodiment, the digital jitter detectors 12A-12C may comprise digital circuitry configured to measure the jitter that is experienced in the integrated circuit 10 and to output an indication of the jitter. Having the digital jitter detectors 12A-12C incorporated into the integrated circuit 10 may permit the jitter detectors to be used at any time to measure jitter. A designer in the lab, for example, with a given instance of the integrated circuit 10 may measure the jitter while diagnosing a problem. Jitter detection may be performed over a sample of integrated circuits, and statistics about the actual jitter being experienced may be developed from the results. In some embodiments, if multiple jitter detectors are included at various physical points within the integrated circuit 10, differences in the jitter across the integrated circuit chip may even be detected.

In one embodiment, each digital jitter detector may include a delay chain, which may have an input and multiple outputs. Each output may be generated by the delay chain responsive to the input, with a different delay associated with each output. The outputs may be captured, and a logic circuit may compare the captured outputs to the expected value (which is input to the logic circuit as a check signal, in one embodiment). The logic circuit may identify one of the captured outputs that is in error, and is also the least delayed among those captured outputs that are in error. Over multiple clock cycles, if jitter is being experienced, different ones of the captured outputs may be identified. The digital jitter detectors may accumulate an indication of which captured outputs have been in error at least once. The indication may thus provide a measurement of the jitter that was experienced over the measured clock cycles.

As used herein, a signal may be "captured in error" if the signal is different than the expected signal that would have occurred in response to the input that generates the signal. For example, an output of the delay chain may be captured in error if the output is not the state that would be expected for the input provided to the delay chain in that clock cycle.

In one embodiment, the result from a given digital jitter detector 12A-12C may comprise a bit vector (also referred to as a verneer). Each bit in the bit vector may correspond to a different one of the outputs of the delay chain. One state of the bit may indicate that the output was captured in error at least one time (e.g. the set state) and the other state may indicate that the output was not captured in error (e.g. the clear state). The opposite assignments of set and clear states may be used in other embodiments, as may any other desired indication.

As mentioned above, the scan control unit 14 may be used to scan out results from the digital jitter detectors 12A-12C. The scan control unit 14 may implement any scan interface (e.g. the test access port (TAP) specified in Institute of Electrical and Electronic Engineers (IEEE) standard 1149.1; level sensitive scan design (LSSD); etc.). The scan interface is represented in FIG. 1 as the scan control signals and SDO. Typically, the interface may include a scan clock, scan enable, scan data input (SDI), scan data output (SDO), etc. In some cases, portions of the scan interface may be connected directly to the digital jitter detectors 12A-12C (e.g. the SDI, the SDO, the scan clock). In other cases, the scan control unit 14 may not be required.

In other embodiments, the output of the digital jitter detectors 12A-12C may be provided using other mechanisms than scan. For example, the output may be directly provided on output pins of the integrated circuit 10. Alternatively, the output may be provided to other circuitry in the integrated circuit 10 for transmission out of the integrated circuit 10 (e.g. broadcast on an interface of the integrated circuit 10). The output may also be written to registers in the integrated circuit 10 or memory in the integrated circuit 10 that may be readable by software.

In some embodiments described below, flops are used as a storage device. However, other embodiments may implement any clocked storage device. Generally, a clocked storage device may include any storage device that is configured to sample an input or inputs responsive to a clock input and to provide the sampled input as an output, in steady state, until the next sample is caused. Clocked storage devices may include flops, latches, registers, etc. The clock input may comprise one or more clock signals (e.g. a flop may receive a single clock signal, master/slave latches may receive separate clock signals for the master and slave, etc.).

Figure 2:
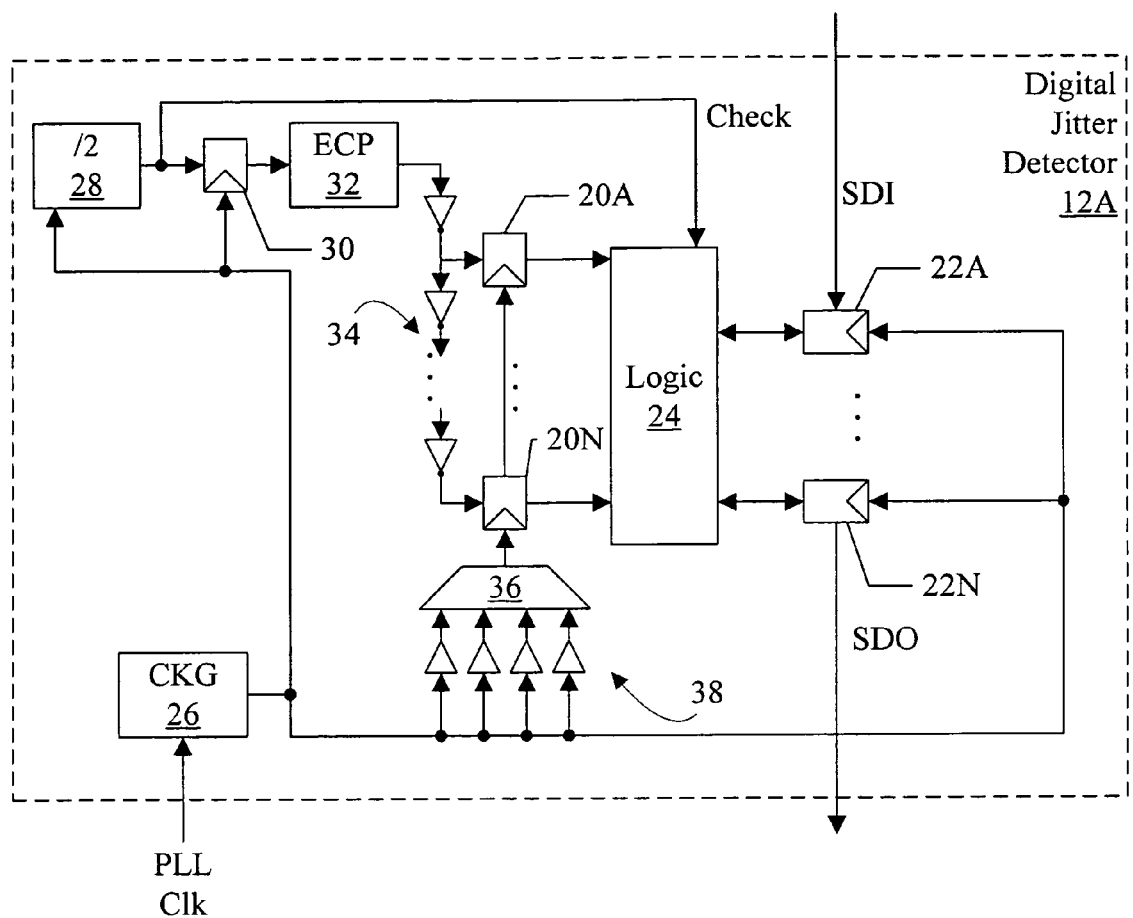
FIG. 2 is a block diagram of one embodiment of a digital jitter detector.

Turning now to FIG. 2, a block diagram of one embodiment of the digital jitter detector 12A is shown. Other digital jitter detectors such as digital jitter detectors 12B-12C may be similar. In the illustrated embodiment, the digital jitter detector 12A includes a plurality of sample flops 20A-20N, a plurality of accumulate flops 22A-22N, a logic circuit 24, a clock generator circuit (CKG) 26, a divide by two circuit 28, a flop 30, an equivalent critical path (ECP) circuit 32, a delay chain 34, a mux 36, and delay elements 38. The CKG 26 is coupled to receive the PLL Clk from the PLL 16, and is configured to generate at least one clock signal. The clock signal from the CKG 26 is provided as a clock input to the divide by two circuit 28, the flop 30, and the flops 22A-22N. The clock signal is also input to the delay elements 38, the outputs of which are input to the mux 36. The output of the mux 36 is a clock input to the flops 20A-20N. The divide by two circuit 28 has an output provided to the flop 30 and provided to the logic circuit 24 as a check signal. The output of the flop 30 is coupled as an input to the ECP circuit 32, which has an output coupled as an input to the delay chain 34. The delay chain 34 has multiple outputs, each coupled as an input to a respective flop 20A-20N. The outputs of the flops 20A-20N are coupled to the logic circuit 24, which is further coupled to the flops 22A-22N. The flop 22A is coupled to receive an SDI input, and the flop 22N is coupled to an SDO output.

The delay chain 34 is configured to generate its outputs responsive to the input, where each output is delayed from the input by a different amount. The delay chain 34 may comprise a series of delay elements to produce the delayed outputs. For example, in the illustrated embodiment, the delay chain 34 comprises series-connected inverters with one of the inverters connected to the input and the output of each inverter being an output of the delay chain. Accordingly, each successive output is delayed by one inverter evaluation delay. Other embodiments may have other delay elements. For example, a non-inverting buffer may be used as delay elements, producing a delay between each successive output of one buffer evaluation delay. Any other logic gates may be used as delay elements as well, or any other desired circuitry, in various embodiments.

The flops 20A-20N capture the respective outputs of the delay chain 34 responsive to a clock input. Assuming that the length of the delay chain (plus the delay of the circuitry that generates the input to the delay chain) exceeds the cycle time of the clock signal(s) forming the clock input, at least one of the outputs is captured in error. That is, the flop 20A-20N that captures the output may capture the output prior to a transition on the output in response to the input to the delay chain for that clock cycle. Each output succeeding that output in the delay chain is also captured in error (since these outputs experience even longer delays). Accordingly, the output that is nearest the input of the delay chain, and is thus the least delayed of the outputs with respect to the input, that is captured in error may be an indication of the length of the clock cycle (including any jitter experienced during that clock cycle). From clock cycle to clock cycle, the jitter effects may vary and thus the least-delayed output that is captured in error may vary from clock cycle to clock cycle.

The logic circuit 24 is configured to identify which of the flops 20A-20N captured the least-delayed and erroneous output from the delay chain 34. Specifically, the logic circuit 24 may use the check signal to compare to the captured outputs in the flops 20A-20N, to detect erroneous captured values. The logic circuit 24 may identify the least delayed of those that are erroneous. The flops 22A-22N accumulate the resulting bit vector over multiple clock cycles, thus providing an indication of the width of the jitter (in units of delay chain element delays, in this embodiment). That is, there may be one flop 22A-22N corresponding to each flop 20A-20N, indicating whether or not the flop 20A-20N captured the least-delayed and erroneous output at least once during the accumulation. After a test is completed, the result vector may be retrieved from the flops 22A-22N. For example, in the illustrated embodiment, the scan control unit 14 may scan the result vector out via the scan data out. In such an embodiment, the flops 22A-22N may be connected into the same scan chain (and optionally with other flops, via the SDI and/or the SDO).

In the illustrated embodiment, the ECP circuit 32 provides the input to the delay chain. The ECP circuit 32 may generally approximate the delay of a critical path or paths of the integrated circuit 10. Thus, a large portion of the clock cycle time may be consumed by the ECP circuit 32, and the various logic stages in the ECP circuit 32 need not be captured by sample flops. A relatively short delay chain and relatively few flops 20A-20N and 22A-22N may be used to cover the remaining clock cycle time, with some amount of extra delay on either side, in some embodiments. At least a portion of the remaining clock cycle time may be dedicated by the designer to absorb jitter effects. The ECP circuit 32 may be extracted from the design of the integrated circuit 10, and may thus include a variety of gates and loads that represent the critical path. Alternatively, the ECP circuit 32 may model the equivalent critical path. For example, in one embodiment, a set of series connected inverters may be used, each driving one other inverter in the series and one or more other inverters providing a model of the load. In particular, 3 inverters are used as the dummy loads in one specific embodiment, although more or fewer inverters may be used in other embodiments.

The flop 30 may launch an input signal into the ECP circuit 32 responsive to the clock input from the CKG 26. Specifically, in the illustrated embodiment, the divide by two circuit 28 divides the clock input by two (in frequency), thus providing a signal that changes binary state each clock cycle, to the opposite binary state as compared to the previous clock cycle. The flop 30 captures the new state and provides that new state stably for the subsequent clock cycle. The divide by two circuit 28 and the flop 30 may be replaced by any circuitry that generates a transition in state each clock cycle and which is stable for the clock cycle, in other embodiments.

In some embodiments, the same clock input may be received by the flops 20A-20B, the flops 22A-22B, the flop 30, and the divide by two circuit 28. In the illustrated embodiment, however, the clock input received by the flops 20A-20N differs from the other clock inputs. The clock input to the flops 20A-20N may be made to lead or lag the other clock inputs using the delay elements 38. Each delay element 38 may introduce a different delay on the clock input to the flops 20A-20N. The desired delay may be selected through the mux 36. Different delays may be used, e.g., to widen the window over which jitter measurements may be made (using multiple test runs with different delays selected through the mux 36). Different delays may be selected if a test run doesn't cover the entire jitter width unambiguously (e.g. the first or last bit of the result bit vector is set). Different delays may be selected for calibration purposes as well.

In the illustrated embodiment, the lead or lag of the clock input to the flops 20A-20N from the clock input generated by the CKG 26 is programmable through the mux 36. For example, the mux controls for the mux 36 may be scanned in by the scan control unit 14, programmed by software writing a register associated with the mux controls, etc.

Figure 3:
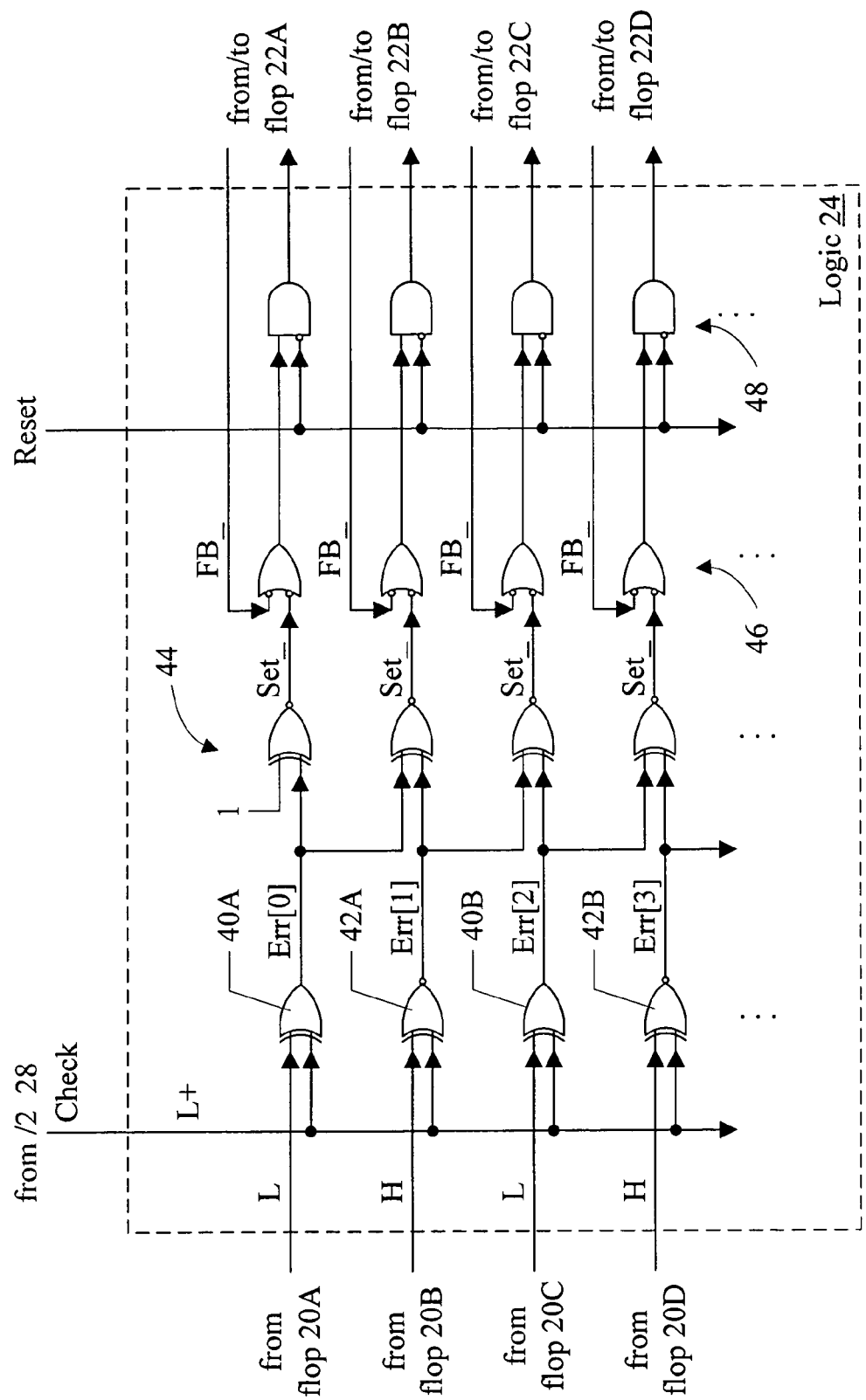
FIG. 3 is a block diagram of one embodiment of a logic circuit shown in FIG. 2.

Turning next to FIG. 3, a block diagram of one embodiment of the logic circuit 24 is shown. The embodiment illustrated in FIG. 3 may be used, e.g., with the embodiment of the delay chain 34 shown in FIG. 2. The logic associated with the initial four outputs of the delay chain 34 is shown (received from the flops 20A-20D). The logic for other outputs of the delay chain 34 (received from the flops 20E-20N) may be similar.

The delay chain 34 in FIG. 2 comprises a series combination of inverters. Accordingly, the output vector from the delay chain 34 comprises alternating binary states (one followed by zero followed by one etc.). Each output changes binary state from clock cycle to clock cycle, and the neighboring outputs have opposite binary state after the transition. A neighboring output or bit refers to a bit that is adjacent to another bit in the logical vector.

To illustrate the alternating states in FIG. 3, the inputs to the logic 24 from the flops 20A-20D are labeled either "L" or "H". If a signal is labeled "L", it is the opposite state of the output of the flop 30 after the transition in the output of the flop 30 has propagated through the ECP circuit 32 and the delay chain 34. That is, a signal labeled "L" is low when the output of the flop 30 is high and high when the output of the flop 30 is low. If a signal is labeled "H", it is the same state as the output of the flop 30 after the transition and propagation. Accordingly, the alternate states of neighboring outputs is illustrated in FIG. 3.

Given a known state launched from the flop 30, an expected value for the flops 20A-20N may be determined. The check signal from the divide by two circuit 28 may be used to check the outputs of the flops 20A-20N against the expected value. Since there are two flops between the divide by two circuit 28 and the outputs of the flops 20A-20N, the check signal is actually logically ahead of the outputs of the flops 20A-20N. However, the divide by two circuit 28 alternately generates a zero and a one in consecutive clock cycles, so knowledge of the current output of the divide by two circuit 28 may be used as the check signal. In one embodiment, the flop 30 inverts its output as well, so the check signal may be labeled as "L", using the naming convention mentioned above. To illustrate that the check signal is logically ahead, it is denoted "L+" in FIG. 3.

Accordingly, the outputs of the flops 20A-20N that are labeled "L" (e.g. the outputs of the flops 20A and 20C in FIG. 3) should have the same state as the check signal. Such signals may be exclusively ORed (XORed) with the check signal to detect an error (e.g. XOR gates 40A-40B in FIG. 3). That is, if the output of the flop and the check signal have opposite states, the output of the XOR gate 40A-40B is asserted and an error is signalled (Err[0] or Err[2] in FIG. 3). On the other hand, the outputs of the flops 20A-20N that are labeled "H" (e.g. the outputs of the flops 20B and 20D in FIG. 3) should have the opposite state as the check signal. Accordingly, such signals may be exclusively NORed (XNORed) with the check signal to detect an error (e.g. XNOR gates 42A-42B in FIG. 3). That is, if the output of the flop and the check signal have the same state, the output of the XNOR gate 42A-42B is asserted and an error is signalled (Err[1] or Err[3] in FIG. 3). While XOR and XNOR gates are shown in FIG. 3, other embodiments may use any Boolean equivalents. For example, the XNOR gates may be replaced by an inverter on the input from the flop 20A-20N and an XOR gate (or an inverter on the check signal input and an XOR gate).

Accordingly, the first level of logic in the logic circuit 24 as illustrated in FIG. 3 may generate an error vector Err[N-1 :0] identifying the outputs of the flops 20A-20N that are in error. The next level of logic may determine the initial error. That is, the error that corresponds to the least-delayed output of the delay chain 34 is determined by the next level of logic. In the illustrated embodiment, the next level of logic comprises XNOR gates 44. Each XNOR gate 44 corresponds to a bit in the error vector and receives that bit and a preceding neighboring bit as inputs (except for the gate corresponding to bit zero of the vector, which has no preceding neighbor and thus receives a constant one as an input). The XNOR gate 44 that receives the least-delayed bit that is in error receives a preceding neighbor in the zero state and an error bit of one. The output of that XNOR gate 44 is a binary zero, while other gates receive both zero inputs or both one inputs, and thus output binary ones. Accordingly, the outputs of the gates 44 are labeled "Set_", with the "_" indicating that the signals are asserted low. At most one Set_signal is asserted for a given clock cycle, indicating the location of the least-delayed error. This signal is an indication of the jitter experienced for that clock cycle.

The remaining logic levels, comprising OR gates 46 (having inverting inputs in this embodiment) and AND gates 48 (having one inverting input as shown in FIG. 3) accumulate the error vector over multiple clock cycles. Each OR gate 46 receives a corresponding Set_signal as an input and the inverse of the current state of the flop 22A-22N as the other input (labeled "FB_" in FIG. 3). Accordingly, if either the current state of the flop is set (FB_asserted low) or the Set signal is asserted low, the output of the OR gate 44 is a binary one. The AND gates 48 pass the output of the OR gates 46 as shown in FIG. 3, unless the Reset signal is asserted to clear the flops 22A-22N. The reset signal may have any source (e.g. the scan control unit 14, a software programmable register, etc.).

In other embodiments, the delay elements forming the delay chain 34 may be non-inverting (e.g. buffers). In such embodiments, the expected value of each bit in the vector from the flops 20A-20N would be the same, and thus the same logic gate would be used for each bit in the first level of logic in FIG. 3. It is noted that, while specific gates are shown in FIG. 3, other embodiments may use any other set of gates, as desired, including Boolean equivalents of the gates (or Boolean equivalents of the gates in any given path or portion of a path).

Figure 4:
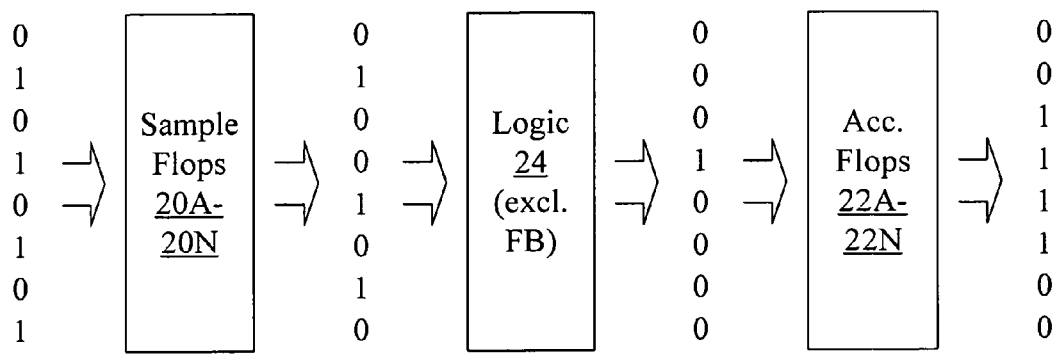
FIG. 4 is an example of operation of one embodiment of a digital jitter detector.

FIG. 4 is a block diagram illustrating an example set of 8 delay chain outputs and the corresponding detection of an error in their sampling. On the left in FIG. 4 is the output of the delay chain 34, alternating binary state between neighboring bits in the vector. The bits are also delayed with respect to each other in time, each successive bit in the vector being delayed from the preceding bit by one delay element of the delay chain. The delay effect is not illustrated in FIG. 4. The least delayed bit is at the top of the vector in FIG. 4, and the most delayed bit is at the bottom of the vector.

The vector is input to the sample flops 20A-20N, which capture bits responsive to the clock input to the flops. Accordingly, at some point in the vector, the sample may occur prior to the evaluation of the delay element in response to the input. The bit sampled at that point, and succeeding bits of the delay chain, may be the opposite of the expected state (since the previous input to the delay chain 34 was of the opposite state). In the example, the fourth bit from the top is sampled in error, along with the remaining bits.

The outputs of the sample flops 20A-20N are provided to the logic 24, which identifies the fourth bit from the top as the least delayed bit that is in error. The identification is illustrated as the output of the logic 24, although the logic 24 also performs the accumulation operation in the embodiment of FIG. 3. Other embodiments may use set/reset flops for the flops 22A-22N, and the logic 24 need not perform the accumulation.

The flops 22A-22N capture the identified error, and accumulate errors to provide an indication of the magnitude of the jitter being experienced. In the example, the accumulated error includes the third to sixth bits in the vector (left hand side of FIG. 4), and thus the jitter magnitude is four delay element times wide in this example.

Figure 5:
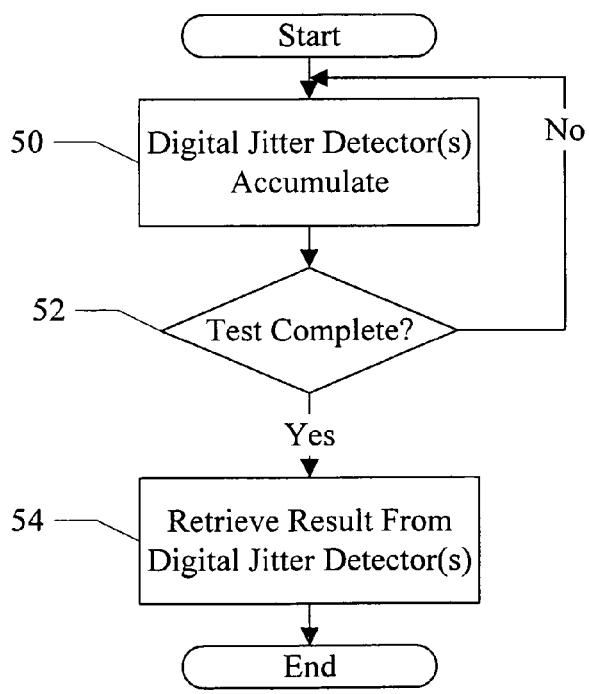
FIG. 5 is a flowchart illustrating one embodiment of a jitter measurement method.

Turning now to FIG. 5, a flowchart is shown illustrating one embodiment of a method of jitter detection/measurement While the blocks are shown in a particular order for ease of understanding, other orders may be used.

The digital jitter detectors 12A-12C may accumulate the jitter measurements over multiple clock cycles (block 50). If the test is not yet complete (that is, the desired number of clock cycles has not occurred) (decision block 52, "no" leg), the accumulating continues. If the test is complete (decision block 52, "yes" leg), the result may be retrieved from the digital jitter detector(s) 12A-12C (block 54). For example, the scan control unit 14 may scan the result out of the digital jitter detectors 12A-12C, or software may read the results.

Numerous variations and modifications will become apparent to those skilled in the art once the above disclosure is fully appreciated. It is intended that the following claims be interpreted to embrace all such variations and modifications.

What is claimed is:
1. A jitter detector comprising:
 a delay chain configured to receive an input and to generate a plurality of outputs responsive to the input, each output delayed from the input by a different delay time;
 a first plurality of clocked storage devices, wherein each of the first plurality of clocked storage devices is coupled to receive a respective output of the plurality of outputs as an input and further coupled to receive a first clock input;
 a logic circuit coupled to receive outputs of the first plurality of clocked storage devices and configured to identify a first clocked storage device of the plurality of clocked storage devices that captures the respective output in error, wherein the first clocked storage device captures the least delayed output of the plurality of outputs that are captured in error;

circuitry configured to generate the input to the delay chain, and wherein the circuitry is further configured to generate a check signal to the logic circuit to check outputs of the first plurality of clocked storage devices to detect error, and wherein the logic circuit is configured to detect that the respective output is in error with respect to an expected value indicated by the check signal; and a second plurality of clocked storage devices coupled to the logic circuit and to receive a second clock input, wherein each of the second plurality of clocked storage devices corresponds to a respective one of the first plurality of clocked storage devices, and wherein the second plurality of clock storage devices are configured to accumulate an indication of which of the first plurality of clocked storage devices has captured the respective output in error, wherein the indication is accumulated over a plurality of clock cycles of the first clock input and the second clock input.

2. The jitter detector as recited in claim 1 wherein the indication comprises a vector having a respective bit corresponding to each of the first plurality of clocked storage devices, and wherein one state of the respective bit indicates that no error has been detected, and wherein another state of the respective bit indicates that one or more errors have been detected.

3. The jitter detector as recited in claim 1 wherein the delay chain comprises a series connection of inverters, and wherein the plurality of outputs of the delay chain are alternate binary states on a given clock cycle.

4. The jitter detector as recited in claim 1 wherein the delay chain comprises a series connection of buffers, and wherein the plurality of outputs of the delay chain are the same binary state on a given clock cycle.

5. The jitter detector as recited in claim 1 wherein the circuitry comprises a divide by two circuit coupled to receive the second clock input.

6. The jitter detector as recited in claim 5 wherein the circuitry further comprises a third clocked storage device coupled to receive the second clock input and an output of the divide by two circuit.

7. The jitter detector as recited in claim 6 wherein the circuitry further comprises an equivalent critical path circuit configured to approximate a critical path of an integrated circuit, wherein the equivalent critical path circuit is coupled to an output of the third clocked storage device and has an output coupled to the input of the delay chain.

8. The jitter detector as recited in claim 1 wherein the first clock input and the second clock input are the same.

9. The jitter detector as recited in claim 1, wherein the first clock input and the second clock input have a same source, and wherein one of the first clock input and the second clock input leads the other.

10. The jitter detector as recited in claim 1 further comprising an equivalent critical path circuit configured to approximate a critical path of an integrated circuit, wherein the equivalent critical path circuit has an output coupled to the input of the delay chain.

11. A jitter detector comprising:
a logic circuit coupled to receive a plurality of inputs indicative of states captured from a plurality of outputs of a delay chain responsive to a first clock input, wherein the logic circuit is further coupled to receive a check input indicative of expected values for the plurality of inputs, and wherein the logic circuit is configured to identify a first input of the plurality of inputs that is: (i) captured in error, as indicated by the check input, from a corresponding one of the plurality of outputs of the delay chain, and (ii) the corresponding one of the plurality of outputs of the delay chain is least delayed by the delay chain among the plurality of outputs that are captured in error; and a plurality of clocked storage devices coupled to the logic circuit and configured to accumulate an indication of which of the plurality of outputs have been captured in error over a plurality of clock cycles of the first clock input.

12. The jitter detector as recited in claim 11 wherein the indication comprises a vector having a respective bit corresponding to each of the plurality of outputs of the delay chain, and wherein one state of the respective bit indicates that no error has been detected, and wherein another state of the respective bit indicates that one or more errors have been detected.

13. The jitter detector as recited in claim 11 wherein the logic circuit comprises an exclusive OR (XOR) logic circuit coupled to receive a second input of the plurality of inputs and the check signal and an exclusive NOR (XNOR) logic circuit coupled to receive a third input of the plurality of inputs and the check signal.

14. The jitter detector as recited in claim 13 wherein the second input and the third input correspond to neighbors in the delay chain.

15. The jitter detector as recited in claim 14 wherein the logic circuit further comprises another XNOR logic circuit coupled to receive outputs of the XOR logic circuit and the XNOR logic circuit to detect if the second input is equal to the first input.

16. A method comprising:
over a plurality of clock cycles of a first clock in an integrated circuit, each of one or more jitter detectors accumulating an indication of which of a plurality of outputs of a delay chain are captured in error responsive to the first clock, wherein a given output of the plurality of outputs is identified in each of the plurality of clock cycles as being the least delayed output that is captured in error and the given output is accumulated in the indication, wherein each jitter detector is configured to generate a check signal indicative of expected values for the plurality of outputs, and wherein the error is detected responsive to the expected value; and outputting the indication from each of one or more jitter detectors subsequent to the plurality of clock cycles.

17. The method as recited in claim 16 wherein the indication comprises a vector having a respective bit corresponding to each of the plurality of outputs of the delay chain, and wherein one state of the respective bit indicates that no error has been detected, and wherein another state of the respective bit indicates that one or more errors have been detected.

18. The method as recited in claim 16 further comprising, in each clock cycle of the plurality of clock cycles, identifying a first output of the plurality of outputs that is: (i) captured in error, and (ii) is least delayed by the delay chain among the plurality of outputs that are captured in error.

* * * * *